United States Patent
Lai et al.

(10) Patent No.: US 11,171,488 B1
(45) Date of Patent: Nov. 9, 2021

(54) SOLAR POWER SYSTEM

(71) Applicants: Austin Lai, Taichung (TW); Kai-Yang Cheng, Taichung (TW); Wei-Fu Hsu, Taichung (TW); Chun-Yu Wu, Taichung (TW)

(72) Inventors: Austin Lai, Taichung (TW); Kai-Yang Cheng, Taichung (TW); Wei-Fu Hsu, Taichung (TW); Chun-Yu Wu, Taichung (TW)

(73) Assignee: AVERTRONICS INC., Taichung (TW)

( * ) Notice: Subject to any disclaimer, the term of this patent is extended or adjusted under 35 U.S.C. 154(b) by 0 days.

(21) Appl. No.: 17/005,277

(22) Filed: Aug. 27, 2020

(30) Foreign Application Priority Data

Apr. 23, 2020 (TW) .................................. 10911365.3

(51) Int. Cl.
*H02J 3/38* (2006.01)
*H02J 7/00* (2006.01)
*H02J 7/35* (2006.01)

(52) U.S. Cl.
CPC .......... *H02J 3/381* (2013.01); *H02J 7/00302* (2020.01); *H02J 7/35* (2013.01); *H02J 2300/26* (2020.01)

(58) Field of Classification Search
CPC .......... H02J 3/381; H02J 3/38; H02J 7/00302; H02J 7/35; H02J 7/00; H02J 2300/26
See application file for complete search history.

(56) References Cited

U.S. PATENT DOCUMENTS 9,300,153 B2 * 3/2016 Fujiyama .................. H02J 7/00

* cited by examiner

*Primary Examiner* — Robert L Deberadinis
(74) *Attorney, Agent, or Firm* — Che-Yang Chen; Law Office of Michael Chen

(57) ABSTRACT

A solar power system may include a solar panel set, a lithium battery set, a first controller, and a second controller. A single-contact switch is electrically connected between the solar panel set and the lithium battery set. When the first controller detects that the generated voltage of the solar panel set reaches a preset threshold value, the first controller is adapted to trigger the first awakening of the lithium battery set by electrically conducting the single-contact switch, thereby brought the lithium battery set out of the low potential protection state. Also, when the second controller detects the voltage of the lithium battery set is not rising after the first awakening of the lithium battery set, the first controller is driven by the second controller to process the second awakening of the lithium battery set through the single-contact switch.

10 Claims, 6 Drawing Sheets

SOLAR POWER SYSTEM

FIELD OF THE INVENTION

The present invention relates to a solar power system and more particularly to a high-efficient solar power system with functions of automatic wakeup under low-potential condition.

BACKGROUND OF THE INVENTION

Generally, the solar power system comprises a battery and a solar panel set having a plurality of solar panels. Due to the non-fixed voltage of sunshine power generation, the battery of the conventional solar power system is prone to damage when directly charged. Also, the battery of the solar power system only can be charged when the output voltage of the solar panel set is higher than the current voltage of the battery. Thus, the conventional solar power system is usually electrically connected to a MPPT (maximum power point tracking) controller to optimize the charging and discharging system of the solar power system. The MPPT controller is configured to have real-time monitoring to the output voltage of the solar panel set and to track the maximum power voltage and maximum power current of the solar power system.

However, the conventional solar power system is still disadvantageous, because: the operation voltage of the MPPT controller has to be over DC 100V such that, generally, the solar panels are electrically connected in series to increase the voltage. Through the MPPT controller, the solar power system is configured to generate electricity at maximum power, and the battery can only be charged after voltage drop, which results in power losses due to voltage rise and drop. Moreover, when the solar power system works under high-illumination environment, the power provided by the MPPT controller is higher than the power loss from voltage drop, but when the solar power system works under low-illumination environment, a small amount of power generated by the solar power system will be totally lost when voltage drop, which makes the solar power system to be only available under high-illumination environment. Also, when the solar panels are often under low-illumination, the battery is not only easy to have over-discharged but also automatically goes into sleep mode of low potential protection due to self-discharging of the battery.

Moreover, although the battery has automatic wake-up function under low potential protection condition, it is powered by the solar panels when the solar power system is under high-illumination environment. Thus, in actual application, the battery might not be charged with enough power and the power supply from the solar panels is not stable when the battery is just awakened. As a result, the battery will get back to the low-potential protection condition, but the system might misjudge the battery has been awakened, which leads that the automatic wake-up function of the battery is failed and the battery is damaged. Therefore, there remains a need for a new and improved design for a solar power system to overcome the problems presented above.

SUMMARY OF THE INVENTION

The present invention provides a solar power system which comprises a solar panel set, a lithium battery set, a first controller, and a second controller. The solar panel set is electrically connected to a regulating charging circuit, a control circuit, and a first detection circuit. The lithium battery set is electrically connected to a single-contact switch and a second detection circuit, and the single-contact switch comprises a first contact and a second contact, and the first contact is electrically connected to the lithium battery set while the second contact is electrically connected to a transformer. The transformer is electrically connected to the regulating charging circuit to cut off the electrical connection between the first contact and the second contact when the lithium battery set is out of power so as to enable the lithium battery set to go into the low potential protection state. The first controller is electrically connected to the control circuit, the first detection circuit, and the single-contact switch, and the solar panel set is configured to provide power for the first controller through the control circuit. When the first detection circuit detects the generated voltage of the solar panel set reaches a preset threshold value, the first controller is adapted to trigger the first awakening of the lithium battery set by electrically conducting the single-contact switch, thereby brought the lithium battery set out of the low potential protection state. The second controller is electrically connected to the second detection circuit, the control circuit, and the first controller, and the solar panel set is adapted to provide power for the second controller through the control circuit. The second controller is adapted to detect the voltage of the lithium battery set through the second detection circuit; when the voltage of the lithium battery set is not rising after the first awakening of the lithium battery set, the first controller is driven by the second controller to process the second awakening of the lithium battery set through the single-contact switch.

In one embodiment, the solar power system comprises a double-contact switch having a third contact, a fourth contact, and a fifth contact, and the third contact is electrically connected to the second contact of the single-contact switch, and the fourth contact is electrically connected to the transformer while the fifth contact is electrically connected to the solar panel set through a direct charging circuit; the first controller is electrically connected to the double-contact switch and is adapted to control the third contact switchably conducting to the fourth contact or the fifth contact, and the first controller is electrically connected to the transformer for voltage control.

In another embodiment, the rated voltage of the solar panel set is 115%-130% of the rated voltage of the lithium battery set; when the first detection circuit detects that the generated voltage of the solar panel set is between 90%-110% of the rated voltage of the lithium battery set, the first controller is configured to conduct the third contact to the fourth contact of the double-contact switch such that the solar panel set under low illumination condition is adapted to directly and low-loss charge the lithium battery set; when the first detection circuit detects that the generated voltage of the solar panel set is over 110% of the rated voltage of the lithium battery set, the first controller is adapted to conduct the third contact to the fifth contact of the double-contact switch such that the solar panel set under high illumination condition is adapted to have voltage drop through the transformer and high efficiently charge the lithium battery set.

In still another embodiment, the solar power system comprises at least a direct current (DC) load and an inverter, and the DC load and the inverter are electrically connected to the second contact of the single-contact switch; the inverter is adapted to transform DC to alternating current (AC), and the inverter is electrically connected to at least an AC load, and the lithium battery set is configured to supply AC power to the AC load.

In a further embodiment, the second controller is adapted to detect the actual voltage of the lithium battery set through the second detection circuit, and the actual voltage of the lithium battery set is over 115% of the rated lithium battery set that is determined as overcharged condition, and the first controller is configured to control the double-contact switch to electrically disconnect the third contact with both of the fourth contact and the fifth contact, and the lithium battery set is adapted to directly supply power to the DC load.

In still a further embodiment, when the third contact of the double-contact switch is electrically disconnected with both of the fourth contact and the fifth contact, the lithium battery set is under high potential protection status, and the power generation of the solar panel set is controlled through the control circuit and the first controller, and the first controller is configured to control the double-contact switch to conduct between the third contact and the fourth contact every thirty minutes, so that the lithium battery set is configured to awake the double-contact switch when not under overcharged condition.

In yet a further embodiment, the inverter is electrically connected to a main electric power; when the third contact of the double-contact switch is electrically disconnected with both of the fourth contact and the fifth contact, the main electric power is adapted to voltage-regulating charge the lithium battery set.

In a particular embodiment, the first controller is electrically connected to a voltage setter and a time setter, and the voltage setter is configured to set the threshold value of the generated voltage of the solar panel set that triggers the conducting between the first contact and the second contact of the single-contact switch, and the time setter is adapted to set the conducting duration between the first contact and the second contact of the single-contact switch, such that the solar power system is configured to be manually set according to different specifications of the solar panel sets and the lithium battery sets.

In an advantageous embodiment, the solar power system comprises a standby battery which keeps full power and is electrically connected to the solar panel set, and the standby battery is electrically connected to the second controller; the first controller is set within daily timing mechanism and the lithium battery set is under the low potential protection state, the first controller is adapted to conduct between the first contact and the second contact of the single-contact switch to awaken the lithium battery set when the actual voltage of the lithium battery set not reaches the preset threshold value, so as to bring the lithium battery set out of the low potential protection state under the low voltage generation condition of the solar panel set.

In a preferred embodiment, the control circuit is electrically connected to a step-down voltage regulator, and the power from the solar panel set is voltage-dropped to 3.3V by the step-down voltage regulator and is divided to the first controller and the second controller, so as to stably provide power to the first controller and the second controller.

Comparing with conventional solar power system, the present invention is advantageous because: (i) with the first controller and the second controller, the failure of awakening the lithium battery set can be overcome by the above two-stage awakened mechanism; (ii) when the first detection circuit detects that the generated voltage of the solar panel set is between 90%-110% of the rated voltage of the lithium battery set, the first controller is configured to conduct the third contact to the fourth contact of the double-contact switch such that the solar panel set under low illumination condition is adapted to directly and low-loss charge the lithium battery set; and (iii) when the first detection circuit detects that the generated voltage of the solar panel set is over 110% of the rated voltage of the lithium battery set, the first controller is adapted to conduct the third contact to the fifth contact of the double-contact switch such that the solar panel set under high illumination condition is adapted to have voltage drop through the transformer and high efficiently charge the lithium battery set.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
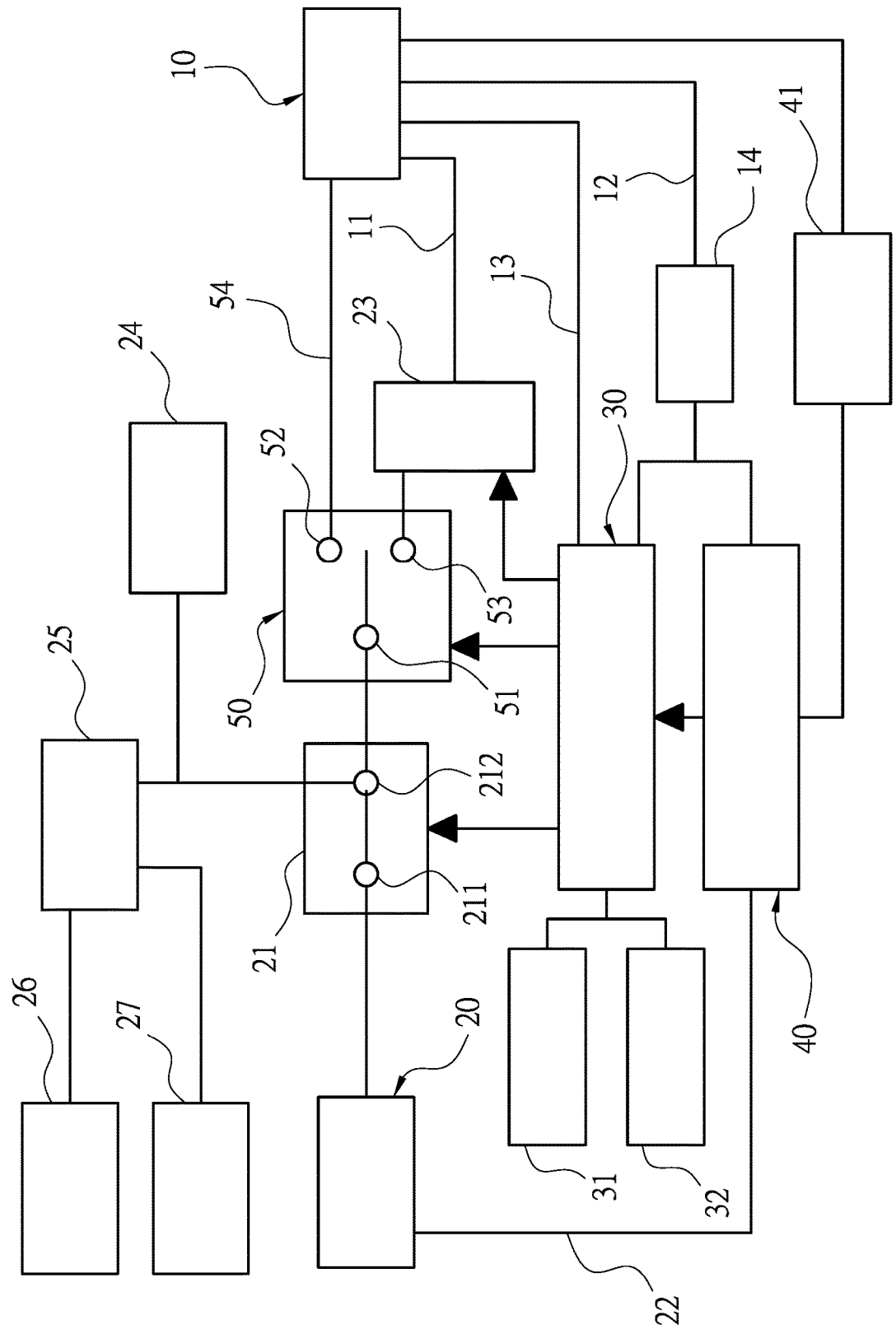
FIG. 1 is a flow block diagram of a solar power system of the present invention.
Figure 2:
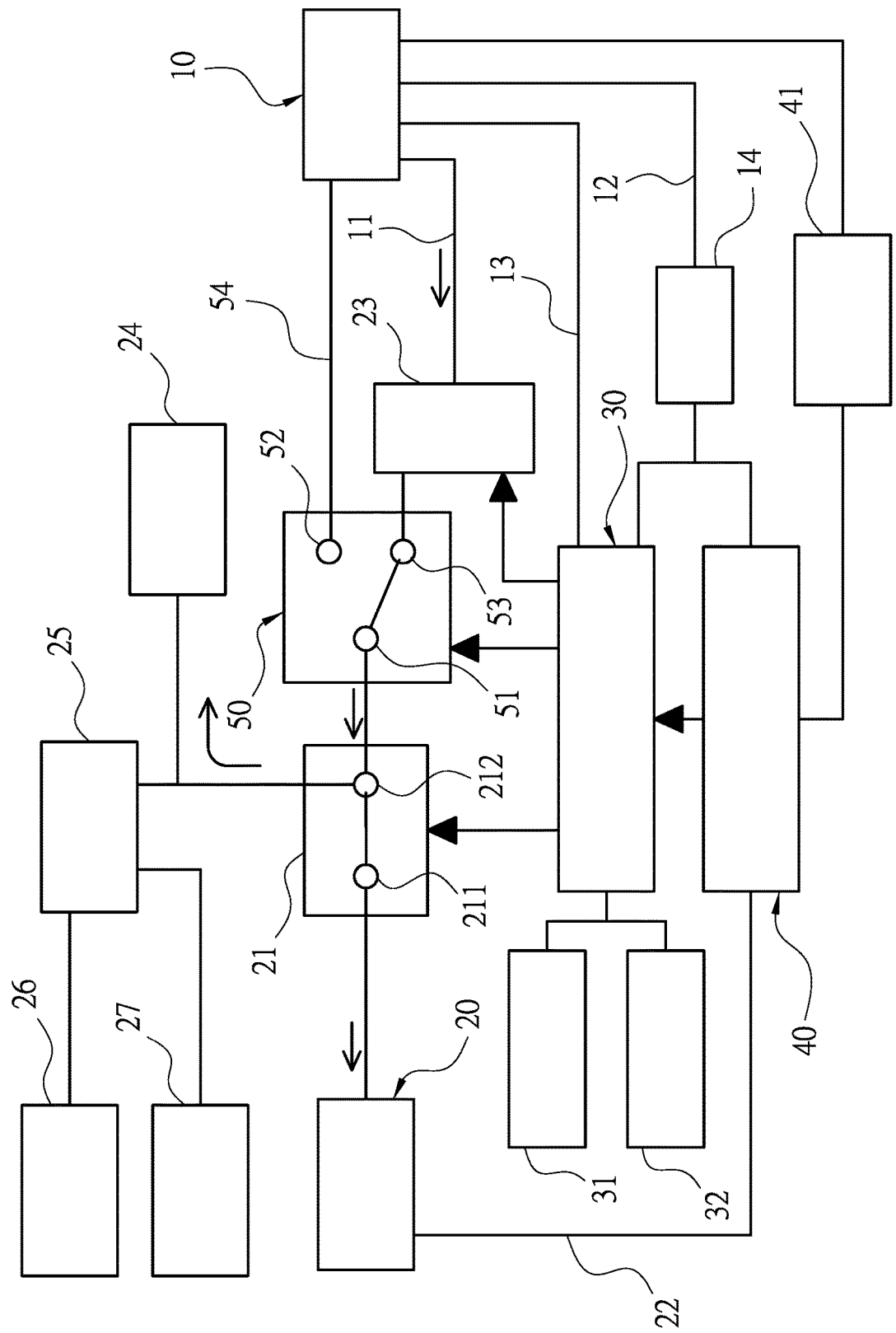
FIG. 2 is a flow block diagram of the solar power system of the present invention under voltage-regulating charging mode.
Figure 3:
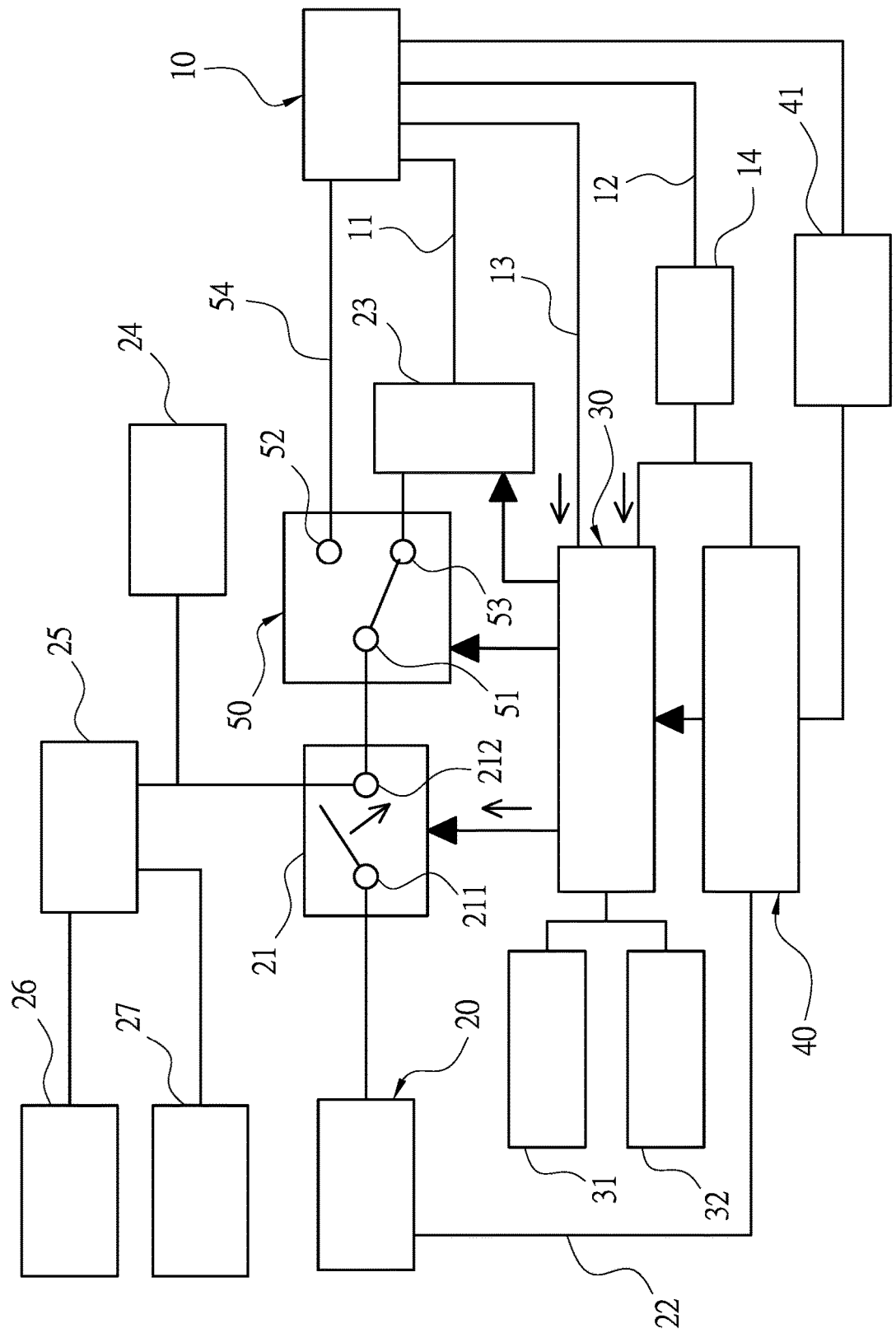
FIG. 3 is a flow block diagram of the solar power system of the present invention when processing the first awakening of a lithium battery set.

In order to further understand the goal, characteristics and effect of the present invention, a number of embodiments along with the drawings are illustrated as following:

Referring to FIGS. 1 to 3, the present invention provides a solar power system which comprises a solar panel set (10), a lithium battery set (20), a first controller (30), and a second controller (40). The solar panel set (10) is electrically connected to a regulating charging circuit (11), a control circuit (12), and a first detection circuit (13). The lithium battery set (20) is electrically connected to a single-contact switch (21) and a second detection circuit (22), and the single-contact switch (21) comprises a first contact (211) and a second contact (212), and the first contact (211) is electrically connected to the lithium battery set (20) while the second contact (212) is electrically connected to a transformer (23). The transformer (23) is electrically connected to the regulating charging circuit (11) to cut off the electrical connection between the first contact (211) and the second contact (212) when the lithium battery set (20) is out of power so as to enable the lithium battery set (20) to go into the low potential protection state. The first controller (30) is electrically connected to the control circuit (12), the first detection circuit (13), and the single-contact switch (21), and the solar panel set (10) is configured to provide power for the first controller (30) through the control circuit (12). Also, when the first detection circuit (13) detects the generated voltage of the solar panel set (10) reaches a preset threshold value, the first controller (30) is adapted to trigger the first awakening of the lithium battery set (20) by electrically conducting the single-contact switch (21), thereby brought the lithium battery set (20) out of the low potential protection state. Moreover, the first controller (30) is electrically connected to a voltage setter (31) and a time setter (32), and the voltage setter (31) is configured to set the threshold value of the generated voltage of the solar panel set (10) that triggers the conducting between the first contact (211) and the second contact (212) of the single-contact switch (21), and the time setter (32) is adapted to set the conducting duration between the first contact (211) and the second contact (212) of the single-contact switch (21), such that the solar power system is configured to be manually set according to different specifications of the solar panel sets (10) and the lithium battery sets (20). The second controller (40) is electrically connected to the second detection circuit (22), the control circuit (12), and the first controller (30), and the solar panel set (10) is adapted to provide power for the second controller (40) through the control circuit (12). In addition, the control circuit (12) is electrically connected to a step-down voltage regulator (14), and the power from the solar panel set (10) is voltage-dropped to 3.3V by the step-down voltage regulator (14) and is divided to the first controller (30) and the second controller (40), so as to stably provide power to the first controller (30) and the second controller (40). Furthermore, the second controller (40) is adapted to detect the voltage of the lithium battery set (20) through the second detection circuit (22). When the voltage of the lithium battery set (20) is not rising after the first awakening of the lithium battery set (20), the first controller (30) is driven by the second controller (40) to process the second awakening of the lithium battery set (20) through the single-contact switch (21). Moreover, the solar power system of the present invention comprises at least a direct current (DC) load (24) and an inverter (25), and the DC load (24) and the inverter (25) are electrically connected to the second contact (212) of the single-contact switch (21), such that the lithium battery set (20) is configured to provide DC power to the DC load (24). Also, the inverter (25) is adapted to transform DC to alternating current (AC), and the inverter (25) is electrically connected to at least an AC load (26), and the lithium battery set (20) is configured to supply AC power to the AC load (26).

Figure 4:
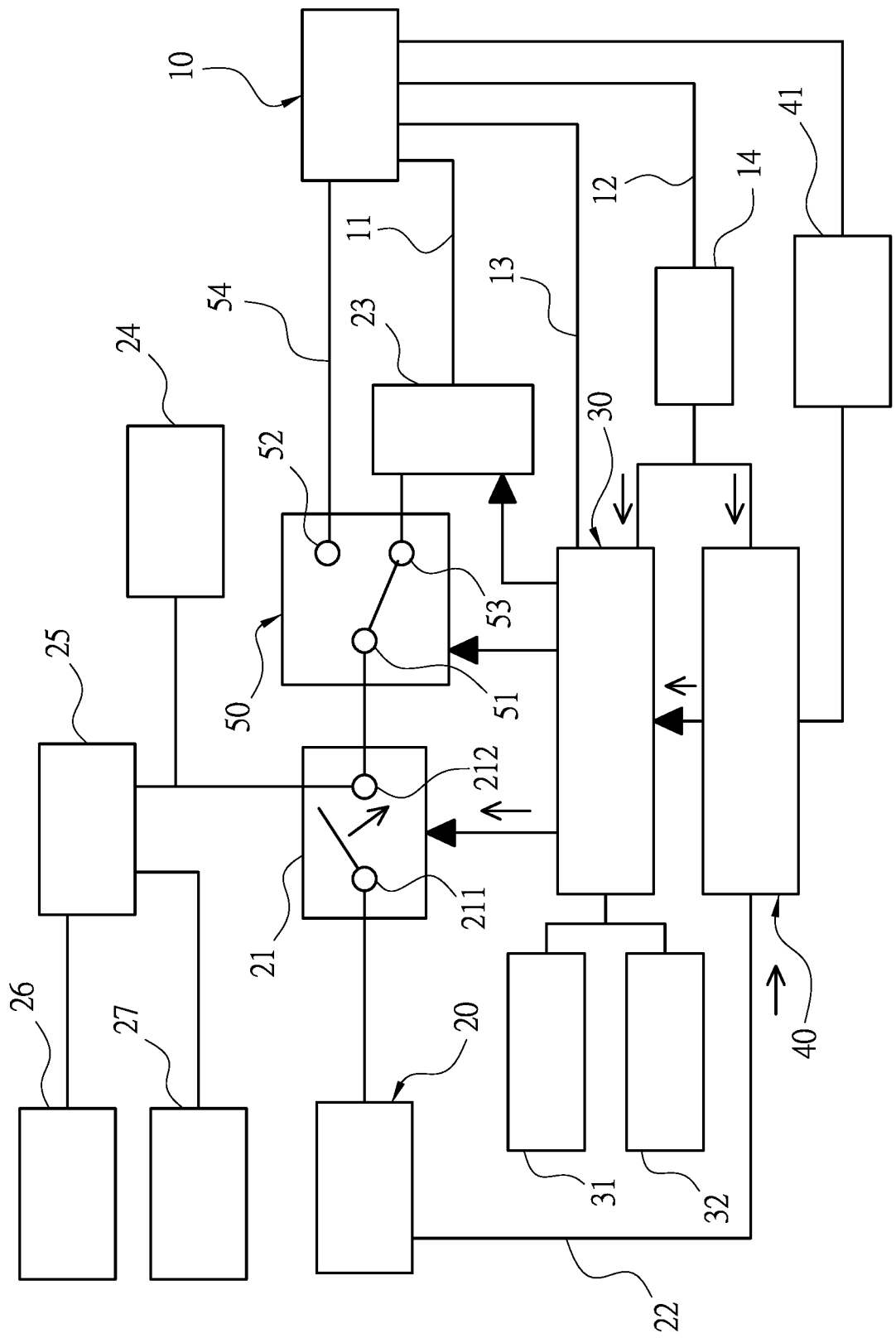
FIG. 4 is a flow block diagram of the solar power system of the present invention when processing the second awakening of the lithium battery set.

Referring to FIG. 2, in case that the solar panel set (10) generates power normally, when the solar panel set (10) generates power in high illumination, the voltage is dropped by the transformer (23) and changes the lithium battery set (20) through the single-contact switch (21). Referring to FIG. 3, when the lithium battery set (20) goes into the low potential protection state due to insufficient charge, the first contact (211) and the second contact (212) of the single-contact switch (21) is electrically disconnected, such that the solar panel set (10) is not charging the lithium battery set (20) and the lithium battery set (20) is not providing power to the DC load (24) or the AC load (26), so as to form the low potential protection state of the lithium battery set (20). Meanwhile, the solar panel set (10) is adapted to provide enough power through the control circuit (12) to run the first controller (30), and the first controller (30) is configured to detect the generated voltage of the solar panel set (10) through the first detection circuit (13). When the generated voltage of the solar panel set (10) reaches the threshold value preset through the voltage setter (31) of the first controller (30) by the user, the first controller (30) is adapted to drive the single-contact switch (21) to conduct the first contact (211) to the second contact (212), and the time setter (32) of the first controller (30) is set to control the conducting duration between the first contact (211) and the second contact (212) of the single-contact switch (21) such that the solar panel set (10) is configured to charge the lithium battery set (20) within the set time. For example, while rated voltage of the lithium battery set is 48V, the threshold value of the generated voltage of the solar panel set (10) can be set as 48V, and the conducting duration can be set as 10$s$, 30$s$ or 60$s$. Additionally, when the voltage of the lithium battery set (20) has risen, the lithium battery set (20) is brought out of the low potential protection state. Furthermore, referring to FIG. 4, when the first controller (30) drives the single-contact switch (21) to trigger the first awakening of the lithium battery set (20), the second controller (40) is activated and powered by the control circuit (12). Meanwhile, the second detection circuit (22) is configured to detect the actual voltage of the lithium battery set (20). When the second detection circuit (22) determines the failure of the first awakening of the lithium battery set (20) as the voltage of the lithium battery set (20) is not rising, the first controller (30) is driven by the second controller (40) to process the second awakening of the lithium battery set (20) through conducting between the first contact (211) and the second contact (212) of the single-contact switch (21). Thus, the failure of awakening the lithium battery set (20) can be overcome through the above two-stage awakened mechanism.

Referring to FIG. 1, the solar power system of the present invention comprises a standby battery (41) which keeps full power and is electrically connected to the solar panel set (10), and the standby battery (41) is electrically connected to the second controller (40). In case that the first controller (30) is set within daily timing mechanism and the lithium battery set (20) is under the low potential protection state, the first controller (30) is adapted to conduct between the first contact (211) and the second contact (212) of the single-contact switch (21) to awaken the lithium battery set (20) when the actual voltage of the lithium battery set (20) not reaches the preset threshold value, so as to bring the lithium battery set (20) out of the low potential protection state under the low voltage generation condition of the solar panel set (10). For instance, the first controller (30) is configured to be set and start a timer when the generated voltage of the solar panel set (10) drops to 0V. Thus, when the weather is bad or at night, according to the setting, the solar power system is adapted to determine whether the lithium battery set (20) is under the low potential protection state after a designated hour, and in case that the lithium battery set (20) is out of the low potential protection state, the first controller (30) stops the timer, and the standby battery (41) is not activated; conversely, in case that the lithium battery set (20) is still under the low potential protection state, which means there is a great probability that the generated voltage of the solar panel set (10) has not exceeded the preset threshold value (48V) on the current day, and the standby battery (41) is activated and is configured to provide power to the first controller (30) and the second controller (40), and the first controller (30) is adapted to drive the single-contact switch (21) to conduct between the first contact (211) and the second contact (212), thereby awakening the lithium battery set (20) under low illumination condition.

Figure 5:
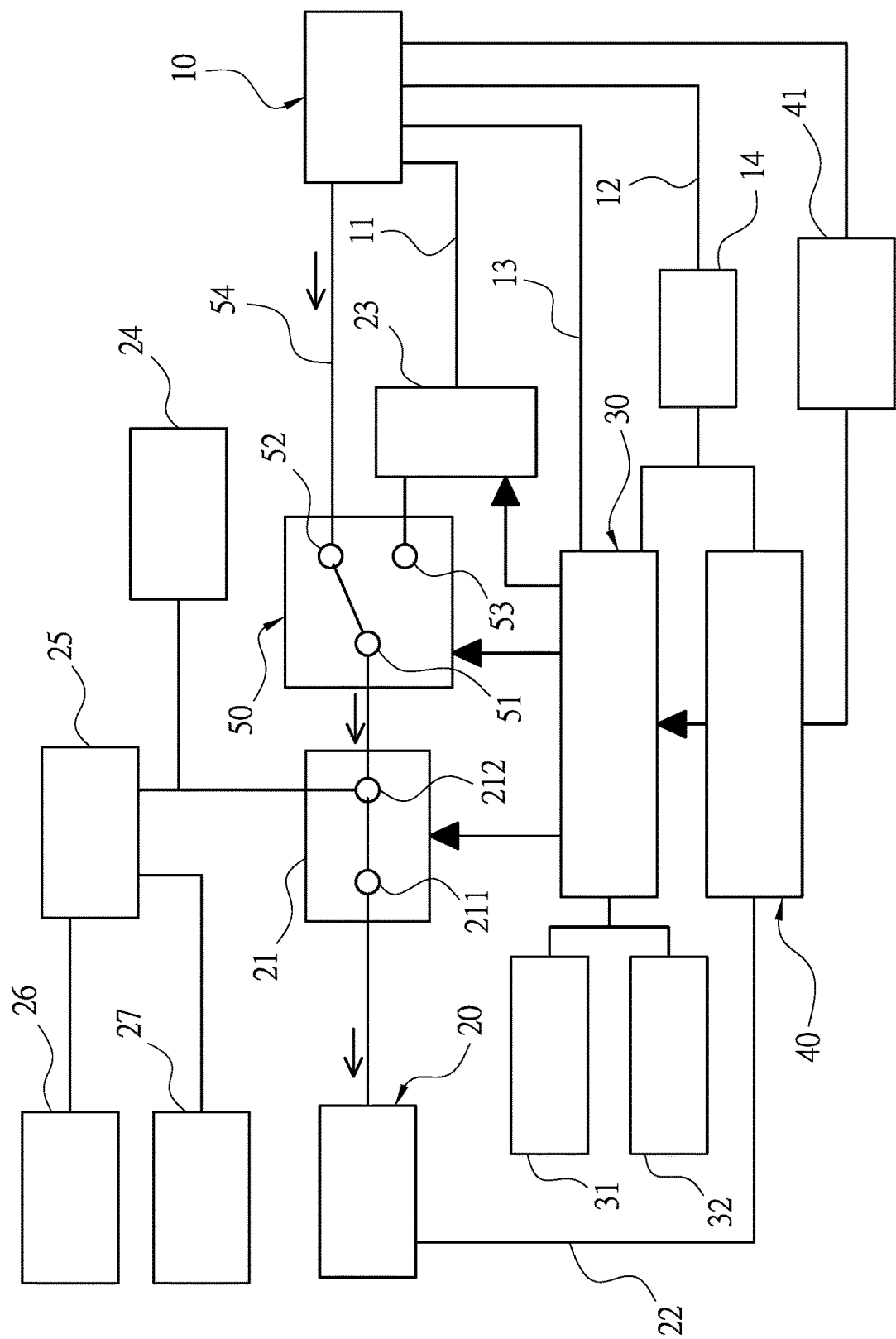
FIG. 5 is a flow block diagram of the solar power system of the present invention under direct charging mode.

Referring to FIG. 2 and FIG. 5, the solar power system of the present invention comprises a double-contact switch (50) having a third contact (51), a fourth contact (52), and a fifth contact (53). The third contact (51) is electrically connected to the second contact (212) of the single-contact switch (21), and the fourth contact (52) is electrically connected to the transformer (23) while the fifth contact (53) is electrically connected to the solar panel set (10) through a direct charging circuit (54). The first controller (30) is electrically connected to the double-contact switch (50) and is adapted to control the third contact (51) switchably conducting to the fourth contact (52) or the fifth contact (53). Moreover, the first controller (30) is electrically connected to the transformer (23) for voltage control. The rated voltage of the solar panel set (10) is 115%-130% of the rated voltage of the lithium battery set (20). When the first detection circuit (13) detects that the generated voltage of the solar panel set (10) is between 90%-110% of the rated voltage of the lithium battery set (20), the first controller (30) is configured to conduct the third contact (51) to the fourth contact (52) of the double-contact switch (50) such that the solar panel set (10) under low illumination condition is adapted to directly and low-loss charge the lithium battery set (20); When the first detection circuit (13) detects that the generated voltage of the solar panel set (10) is over 110% of the rated voltage of the lithium battery set (20), the first controller (30) is adapted to conduct the third contact (51) to the fifth contact (53) of the double-contact switch (50) such that the solar panel set (10) under high illumination condition is adapted to have voltage drop through the transformer (23) and high efficiently charge the lithium battery set (20). For example, in case that the rated voltage of the lithium battery set (20) is 48V and the rated voltage of the solar panel set (10) is between 55.2V and 62.4V, the first controller (30) can be directly set that the threshold of switching charging mode as the actual voltage of the lithium battery set (20) is 52.8V. Thus, when the generated voltage of the solar panel set (10) is between 43.2V and 52.8V, the first controller (30) is adapted to control the double-contact switch (50) to conduct between the third contact (51) and the fourth contact (52), and the solar panel set (10) under low illumination condition is adapted to directly and low-loss charge the lithium battery set (20). On the other hand, when the generated voltage of the solar panel set (10) is over 52.8V, the first controller (30) is adapted to control the double-contact switch (50) to conduct between the third contact (51) and the fifth contact (53), and the solar panel set (10) under high illumination condition is adapted to have voltage drop through the transformer (23) and charge the lithium battery set (20). The voltage setter (31) of the first controller (30) is configured to set the values according to the different specifications of the solar panel sets (10) and the lithium battery sets (20) to achieve the switching of charging modes, thereby simplifying the structure, reducing costs and improving applicability.

Figure 6:
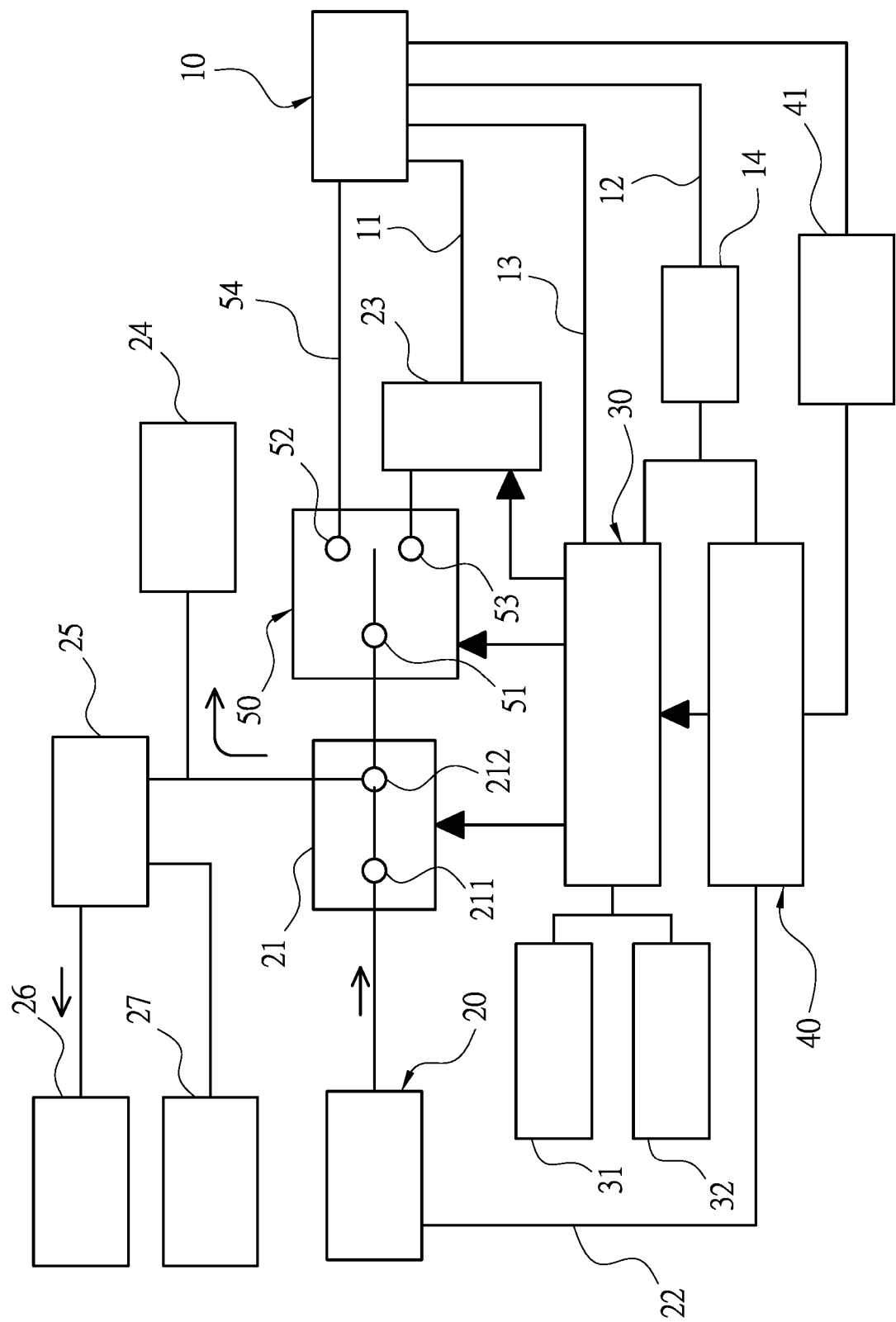
FIG. 6 is a flow block diagram of the solar power system of the present invention when the lithium battery set is under high potential protection status.

Referring to FIG. 6, the second controller (40) is adapted to detect the actual voltage of the lithium battery set (20) through the second detection circuit (22). The actual voltage of the lithium battery set (20) is over 115% of the rated lithium battery set (20) that is determined as overcharged condition, and the first controller (30) is configured to control the double-contact switch (50) to electrically disconnect the third contact (51) with both of the fourth contact (52) and the fifth contact (53), and the lithium battery set (20) is adapted to directly supply power to the DC load (24). Moreover, the inverter (25) is electrically connected to a main electric power (27). When the third contact (51) of the double-contact switch (50) is electrically disconnected with both of the fourth contact (52) and the fifth contact (53), the main electric power (27) is adapted to voltage-regulating charge the lithium battery set (20). Meanwhile, high potential protection mechanism of the lithium battery set (20) is formed, and the power generation of the solar panel set (10) is controlled through the control circuit (12) and the first controller (30), and the first controller (30) is configured to control the double-contact switch (50) to conduct between the third contact (51) and the fourth contact (52) every thirty minutes, so that the lithium battery set (20) is configured to awake the double-contact switch (50) when not under overcharged condition.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A solar power system comprising a solar panel set, a lithium battery set, a first controller, and a second controller;
   wherein the solar panel set is electrically connected to a regulating charging circuit, a control circuit, and a first detection circuit;
   wherein the lithium battery set is electrically connected to a single-contact switch and a second detection circuit, and the single-contact switch comprises a first contact and a second contact, and the first contact is electrically connected to the lithium battery set while the second contact is electrically connected to a transformer; the transformer is electrically connected to the regulating charging circuit to cut off the electrical connection between the first contact and the second contact when the lithium battery set is out of power so as to enable the lithium battery set to go into the low potential protection state;
   wherein the first controller is electrically connected to the control circuit, the first detection circuit, and the single-contact switch, and the solar panel set is configured to provide power for the first controller through the control circuit; when the first detection circuit detects the generated voltage of the solar panel set reaches a preset threshold value, the first controller is adapted to trigger the first awakening of the lithium battery set by electrically conducting the single-contact switch, thereby brought the lithium battery set out of the low potential protection state; and
   wherein the second controller is electrically connected to the second detection circuit, the control circuit, and the first controller, and the solar panel set is adapted to provide power for the second controller through the control circuit, and the second controller is adapted to detect the voltage of the lithium battery set through the second detection circuit; when the voltage of the lithium battery set is not rising after the first awakening of the lithium battery set, the first controller is driven by the second controller to process the second awakening of the lithium battery set through the single-contact switch.

2. The solar power system of claim 1, wherein the solar power system comprises a double-contact switch having a third contact, a fourth contact, and a fifth contact, and the third contact is electrically connected to the second contact of the single-contact switch, and the fourth contact is electrically connected to the transformer while the fifth contact is electrically connected to the solar panel set through a direct charging circuit; the first controller is electrically connected to the double-contact switch and is adapted to control the third contact switchably conducting to the fourth contact or the fifth contact, and the first controller is electrically connected to the transformer for voltage control.

3. The solar power system of claim 2, wherein the rated voltage of the solar panel set is 115%-130% of the rated voltage of the lithium battery set; when the first detection circuit detects that the generated voltage of the solar panel set is between 90%-110% of the rated voltage of the lithium battery set, the first controller is configured to conduct the third contact to the fourth contact of the double-contact switch such that the solar panel set under low illumination condition is adapted to directly and low-loss charge the lithium battery set; when the first detection circuit detects that the generated voltage of the solar panel set is over 110% of the rated voltage of the lithium battery set, the first controller is adapted to conduct the third contact to the fifth contact of the double-contact switch such that the solar panel set under high illumination condition is adapted to have voltage drop through the transformer and high efficiently charge the lithium battery set.

4. The solar power system of claim 1, wherein the solar power system comprises at least a direct current (DC) load and an inverter, and the DC load and the inverter are electrically connected to the second contact of the single-contact switch; the inverter is adapted to transform DC to alternating current (AC), and the inverter is electrically connected to at least an AC load, and the lithium battery set is configured to supply AC power to the AC load.

5. The solar power system of claim 4, wherein the second controller is adapted to detect the actual voltage of the lithium battery set through the second detection circuit, and the actual voltage of the lithium battery set is over 115% of the rated lithium battery set that is determined as overcharged condition, and the first controller is configured to control the double-contact switch to electrically disconnect the third contact with both of the fourth contact and the fifth contact, and the lithium battery set is adapted to directly supply power to the DC load.

6. The solar power system of claim 5, wherein when the third contact of the double-contact switch is electrically disconnected with both of the fourth contact and the fifth contact, the lithium battery set is under high potential protection status, and the power generation of the solar panel set is controlled through the control circuit and the first controller, and the first controller is configured to control the double-contact switch to conduct between the third contact and the fourth contact every thirty minutes, so that the lithium battery set is configured to awake the double-contact switch when not under overcharged condition.

7. The solar power system of claim 4, wherein the inverter is electrically connected to a main electric power; when the third contact of the double-contact switch is electrically disconnected with both of the fourth contact and the fifth contact, the main electric power is adapted to voltage-regulating charge the lithium battery set.

8. The solar power system of claim 1, wherein the first controller is electrically connected to a voltage setter and a time setter, and the voltage setter is configured to set the threshold value of the generated voltage of the solar panel set that triggers the conducting between the first contact and the second contact of the single-contact switch, and the time setter is adapted to set the conducting duration between the first contact and the second contact of the single-contact switch, such that the solar power system is configured to be manually set according to different specifications of the solar panel sets and the lithium battery sets.

9. The solar power system of claim 1, wherein the solar power system comprises a standby battery which keeps full power and is electrically connected to the solar panel set, and the standby battery is electrically connected to the second controller; when the first controller is set within daily timing mechanism and the lithium battery set is under the low potential protection state, the first controller is adapted to conduct between the first contact and the second contact of the single-contact switch to awaken the lithium battery set when the actual voltage of the lithium battery set not reaches the preset threshold value, so as to bring the lithium battery set out of the low potential protection state under the low voltage generation condition of the solar panel set.

10. The solar power system of claim 1, wherein the control circuit is electrically connected to a step-down voltage regulator, and the power from the solar panel set is voltage-dropped to 3.3V by the step-down voltage regulator and is divided to the first controller and the second controller, so as to stably provide power to the first controller and the second controller.

* * * * *